(12) United States Patent
Weichbrodt

(10) Patent No.: US 8,172,064 B2
(45) Date of Patent: May 8, 2012

(54) DRIFT CONVEYOR HAVING A BEARING ELEMENT

(75) Inventor: Reinhold Weichbrodt, Wermelskirchen (DE)

(73) Assignee: Interroll Holding AG (CH)

( * ) Notice: Subject to any disclaimer, the term of this patent is extended or adjusted under 35 U.S.C. 154(b) by 556 days.

(21) Appl. No.: 12/310,002

(22) PCT Filed: Aug. 7, 2007

(86) PCT No.: PCT/EP2007/006979
§ 371 (c)(1),
(2), (4) Date: Feb. 23, 2009

(87) PCT Pub. No.: WO2008/017460
PCT Pub. Date: Feb. 14, 2008

(65) Prior Publication Data
US 2009/0321216 A1    Dec. 31, 2009

(30) Foreign Application Priority Data

Aug. 9, 2006    (DE) .......................... 10 2006 037 261

(51) Int. Cl.
*B65G 39/09* (2006.01)
(52) U.S. Cl. .................... 193/37; 193/35 R; 198/780
(58) Field of Classification Search ............... 198/780; 193/35 R, 37; 384/130, 144, 215, 225
See application file for complete search history.

(56) References Cited

U.S. PATENT DOCUMENTS

| | | | |
|---|---|---|---|
| 2,190,336 A | 6/1936 | Olson | |
| 3,353,644 A * | 11/1967 | McNash et al. | 193/37 |
| 3,610,387 A * | 10/1971 | Vom Stein | 193/37 |
| 4,520,689 A | 6/1985 | Sucro et al. | |
| 5,025,917 A * | 6/1991 | Smith et al. | 198/842 |
| 5,074,408 A * | 12/1991 | Smith et al. | 198/842 |
| 5,188,214 A * | 2/1993 | Uttke et al. | 198/501 |
| 5,261,528 A * | 11/1993 | Bouchal | 198/842 |
| 6,076,647 A | 6/2000 | Agnoff | |
| 6,209,702 B1 * | 4/2001 | Agnoff | 193/37 |
| 6,234,293 B1 * | 5/2001 | Fasoli | 193/37 |
| 6,516,942 B2 * | 2/2003 | East | 198/830 |
| 6,547,054 B2 * | 4/2003 | Gamache | 193/37 |
| 6,682,077 B1 * | 1/2004 | Letourneau | 277/412 |
| 6,702,091 B2 * | 3/2004 | Nimmo et al. | 193/37 |

(Continued)

FOREIGN PATENT DOCUMENTS

DE    1 213 171    3/1966

(Continued)

*Primary Examiner* — Douglas Hess
(74) *Attorney, Agent, or Firm* — Gerald E. Hespos; Michael J. Porco

(57) ABSTRACT

A drift conveyor (1) has rollers (14) introduced into bearings (13) of a frame (12). An axle (143) of the roller (14) is received in a receptacle (1310) of the bearing (13), and a roller plate (15) presses the bearing (13) so that a first sealing region (1308) of the bearing (13) contacts a sealing region (152) of the roller plate (15). A rotary fastening region of the bearing (13) contacts a fastening region (153a) of the roller plate (15) and a second sealing region of the bearing (13) contacts the frame sealing region. One side of the bearing (13) has the receptacle (1310), the first sealing region (1308) and a rotary fastening region that prevents rotation of the bearing (13) with respect to the roller plate (15). An opposite side of the bearing (13) has a second region for sealing between the bearing (13) and the frame (12).

33 Claims, 7 Drawing Sheets

U.S. PATENT DOCUMENTS

| | | | |
|---|---|---|---|
| 6,802,410 B2 * | 10/2004 | Dyson et al. | 193/37 |
| 6,814,213 B2 * | 11/2004 | Dyson et al. | 193/37 |
| 7,497,313 B2 * | 3/2009 | Bogdanovic | 193/35 A |
| 7,588,372 B2 * | 9/2009 | Fournier | 384/478 |
| 7,621,388 B2 * | 11/2009 | Vlk et al. | 193/37 |

FOREIGN PATENT DOCUMENTS

| | | |
|---|---|---|
| DE | 1 525 103 | 9/1969 |
| DE | 23 38 950 | 2/1975 |
| DE | 80 05 696 | 8/1980 |
| DE | 33 45 368 | 6/1985 |
| DE | 42 15 715 | 11/1993 |
| DE | 93 06 972 | 12/1993 |
| DE | 196 17 482 | 11/1997 |
| DE | 100 28 783 | 1/2002 |
| WO | WO 99/16686 | 4/1999 |

* cited by examiner 154
143
152/153

14

Fig 6a
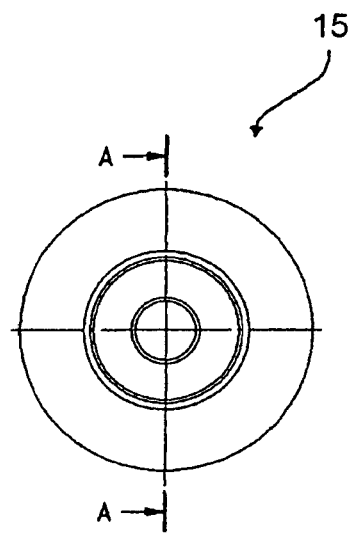
Fig. 6b
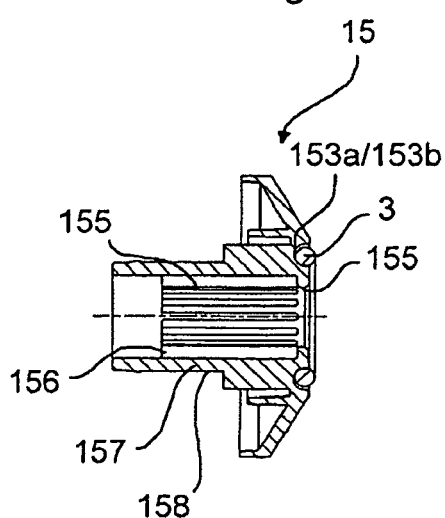
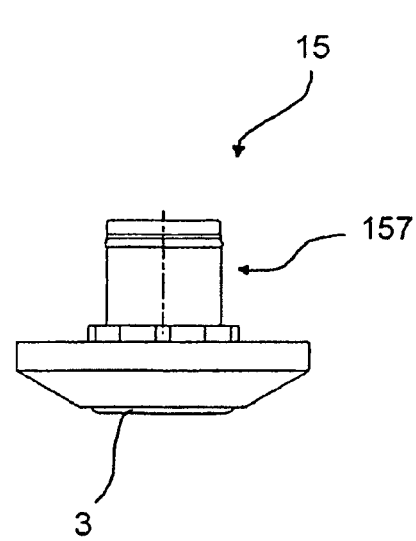
Fig. 6c
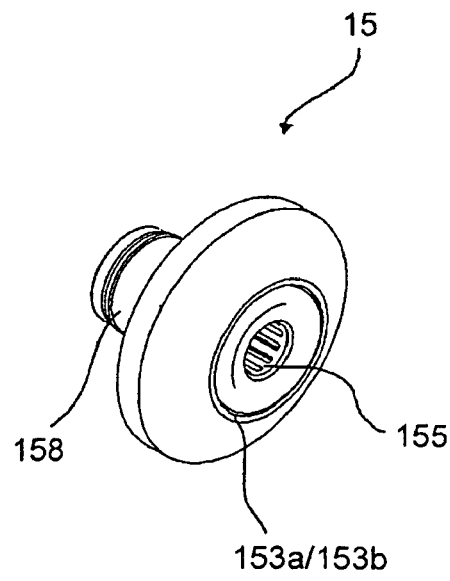
Fig. 6d

Fig. 7a
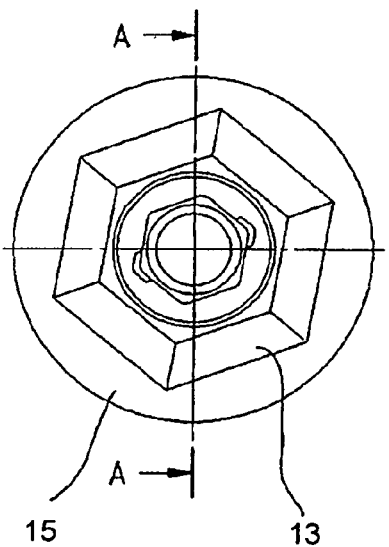
Fig. 7b
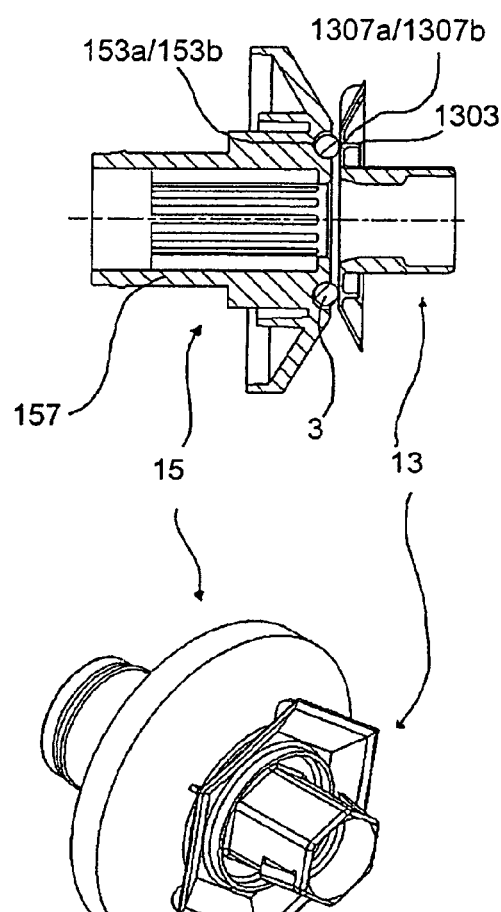
Fig. 7c
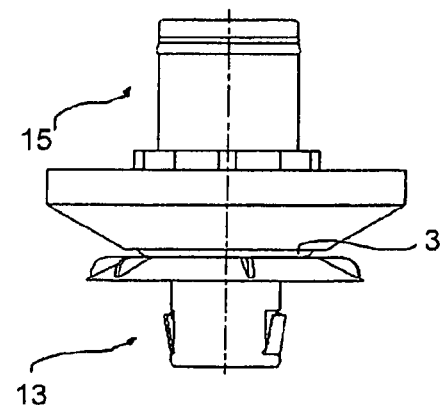
Fig. 7d

DRIFT CONVEYOR HAVING A BEARING ELEMENT

BACKGROUND OF THE INVENTION

1. Field of the Invention

The invention relates to a bearing element for insertion into a bearing frame having a sealing function for holding a roller axle which is to be supported, to a roller plate for end-side coverage of a transport roller, to such a transport roller and to a drift conveyor which has, inter alia, a bearing frame, such a transport roller and such a bearing element.

2. Description of the Related Art

Drift conveyors which have a profile frame which is inserted into the conveyor rollers can already be found in the prior art. These conveyor rollers have axle bolts and are mounted so as to be rotatable about the axle bolts. The axle bolts are inserted into corresponding holes which are provided in the profile frame. In this context, the holes in profile frames and the diameter of the axle bolts are dimensioned with play, and the conveyor rollers can therefore be mounted in an unconstrained way.

Profile frames are partially manufactured from closed profiles and from profiles with covers, and the control electronics for drives and sensors can therefore be accommodated in the cavity in the profile.

Depending on which goods are to be transported by means of the conveyor systems, the conveyor systems must be partially cleaned. In this context efforts are made to ensure that during the cleaning process no moisture enters the interior of the profile which can damage the electronics there. To a certain extent, this is achieved by virtue of the fact that holes are not bored in the profile but instead axle mounts are attached to the closed profile from the outside. Said axle mounts are to a certain extent welded on or screwed on. This ensures that no moisture can penetrate the profile. However, the manufacture of such profiles with axle mounts which are attached to the outside is costly and expensive. Furthermore, in the known designs of conveyor systems, vibrations and disruptive noises occur in some cases during operation, with the result that the known conveyor systems can be operated only at low conveyor speeds.

The object of the invention is to make available means which permit advantageous manufacture of a drift conveyor which can be operated at high conveying speeds and is reliable during operation and easy to clean.

SUMMARY OF THE INVENTION

One aspect of the invention relates to a bearing element having a sealing function, for holding a roller axle which is to be supported and for insertion into a bearing frame which has an axle receptacle, a first sealing region and a rotation locking region on a first side, which is configured in such a way that rotation of the bearing element with respect to a component which adjoins on the first side, in particular with respect to a roller plate which is likewise a subject of this application, can be prevented, and which has, on a second side, lying essentially opposite the first side of the bearing element, a second sealing region for providing a seal between the bearing element and the bearing frame. In this context, the rotation locking region can preferably be embodied as a positive locking engagement region or as a frictional locking region, as is described in more detail below. Such a bearing element has the advantage that a seal is effected both between the bearing element and the bearing frame as well as between the bearing element and the roller plate, and dust and fluid therefore cannot pass through the recess in the bearing frame and into the interior of the bearing frame. The rotational locking between the bearing element and roller plate ensures that the two components cannot rotation relative to one another, and moisture, which could be transported into the interior past the seal when there is a relative rotation of the sealing faces, is prevented from entering the interior of the profile. In addition, a transport roller with a plate which is secured against rotation has a longer service life. Furthermore, the bearing element serves to protect the surface of the bearing element, and the surface quality of the bearing element therefore cannot be so easily damaged during assembly. The terms "first side" and "second side" which are used are to be understood in a functional way. The intention is to provide two sealing faces on two sides of the bearing element. In this context, the terms can be understood as two sides in the axial direction or two sides in the radial direction. If the sealing faces are provided on two sides lying axially opposite one another, this has the advantage that a seal can be generated by means of a force in the axial direction, while positively locking engagement takes place by means of a configuration on the circumferential face, that is to say in the circumferential direction. This has the advantage that the functional faces can be provided without double fitting. However, it is also conceivable to provide both functional faces on the circumference of the bearing element. The bearing element is preferably manufactured in one piece. The bearing element is preferably an injection molded component, that is to say is manufactured using an injection molding method.

Such a bearing element is preferably configured in such a way that the first sealing region and the first rotation locking region at least partially coincide, and a first surface region of the first rotation locking region is therefore likewise configured as a first sealing face of the first sealing region. Advantages of this embodiment are in particular the fact that the function faces which ensure sealing also serve at the same time to prevent a relative movement between the adjoining components. This can ensure a very small overall size.

In such a bearing element, the first surface region is preferably configured in such a way that in a developed view of a sectional plane which coincides essentially with a cylinder face about a reference axis of the roller axle to be held and which runs through the first surface region, a curve runs along the surface profile, essentially along a zigzag-shaped or corrugated curve, in particular a sinusoidal curve, and the first rotation locking region is therefore embodied as a first positively locking engagement region. This reliably prevents rotation of the components. A smaller value can therefore be selected for the contact pressure between the adjoining parts than in the case of frictional locking during which the contact force has to be dimensioned as a function of the values of the coefficient friction of the adjoining components in such a way that a sufficient frictional force results. This configuration also ensures that two congruent faces are made available on the adjoining components and when the components are installed a seal-forming engagement of the functional faces is ensured even if the components are only installed rotated with respect to one another by a few degrees. During installation, it is therefore not necessary to pay attention to the precise orientation of the components with respect to one another.

The first surface region of the bearing element is preferably configured in such a way that the locus curves of at least some of the points on the zigzag-shaped or corrugated curve run outward in an essentially radial direction along the surface profile from the reference axis. This configuration has the advantage that the shapes for manufacture of the corresponding components can easily be manufactured.

According to one advantageous embodiment, such a bearing element has a surface configuration which surrounds the sealing region and which is embodied as a first part of a labyrinth seal. A further labyrinth seal has the advantage that dirt or liquid can only penetrate with great difficulty as far as the first sealing region.

Such a bearing element advantageously has a mushroom-like shape with a cap element and a stem element, wherein the first sealing region is arranged on the side of the cap element facing away from the stem element. The mushroom-like shape has the advantage of a flat construction, wherein different sealing faces can be provided on the cap-like element.

It is furthermore advantageous if the bearing element has a mushroom-like shape with a cap element and a stem element, wherein the second sealing region is arranged on the side of the cap element facing the stem element. The provision of the second sealing region on the bearing frame side has the advantage that the stem element can be provided as a positive locking engagement region which corresponds to, for example, a polygonal recess in the bearing frame which as such would be difficult to seal, while the area surrounding the bearing frame is level and smooth and can serve satisfactorily as a sealing face.

According to a further advantageous embodiment of the bearing element, the second sealing region is formed from a preferably resilient sealing lip in the edge region of the cap element and/or from a preferably less resilient central sealing region of the cap element which is arranged essentially adjacent to the stem element, wherein, in the state in which it is not inserted into the bearing frame, the resilient sealing lip preferably protrudes beyond the central sealing region in the direction of the bearing frame side. This has the advantage that the sealing lip can easily adapt to the surface of the bearing frame, even if the latter has an uneven surface or is bent, and that the sealing lip deforms elastically when it is inserted into the bearing frame, and ensures a seal, even without corresponding contact pressure via an adjacent component.

Such a bearing element advantageously has a second positively locking engagement region on the second side, preferably in the region of the stem element, wherein the second positive locking engagement region is configured in such a way that rotation of the bearing element with respect to a second component which adjoins on the second side, in particular the bearing frame, is prevented. This also prevents, in the second sealing region, that dirt or moisture is transported into the interior of the bearing frame by means of a relative rotation between the bearing element and the bearing frame.

In such a bearing element, the second positively locking engagement region is preferably formed at least partially from a polygonal cross-sectional region, preferably from a hexagonal cross-sectional region, of the stem element. Such a hexagonal cross-sectional region is easy to manufacture both with respect to the bearing element and with respect to the corresponding recess in the bearing frame.

According to a further advantageous embodiment, in such a bearing element at least one holding element is provided which is configured in such a way that, in the state in which it is inserted into the bearing frame, it engages behind a corresponding holding region of the bearing frame in such a way that the bearing element is secured against dropping or sliding out of the bearing frame, wherein the distance between the central sealing region of the bearing element and the holding element of the bearing element is essentially equal to or somewhat smaller than the distance between the holding region of the bearing element and a bearing frame sealing region which coincides with the central sealing region. This has the advantage that when the bearing element is inserted into the bearing frame tension is formed in the bearing element which causes the second sealing region to be pulled to the corresponding bearing frame sealing region.

In such a bearing element, the axle receptacle is embodied as a blind hole. This has the advantage that such a bearing element already has a seal-forming function even before a roller axle has been inserted into the axle receptacle and an adjacent component has been provided with a sealing face which corresponds to the first sealing face.

In such a bearing element, the axle receptacle is particularly advantageously embodied as a through hole. This variant is easy and cheaper to manufacture than a blind hole. Furthermore, a sprung roller axle can be pressed into the interior of the roller through the through hole, and a transport roller can therefore be easily disinstalled.

It is also advantageous if, in the case of such a bearing element, the axle receptacle is dimensioned, with respect to a roller axle which is to be accommodated, in such a way that a fit is provided between the roller axle and the axle receptacle, where the fit impedes or prevents rotation between the roller axle and the bearing element. Particularly in the case of non-driven rollers, such a (press) fit is sufficient to transmit torques which occur, and such a fit can more conveniently be manufactured than an additional positively locking engagement region. Furthermore, such a fit has an additional sealing function.

In such a bearing element, the axle receptacle preferably has a third positively locking engagement region which coincides with an axle region of the roller axle and is configured in such a way that rotation between the roller axle and the bearing element is impeded or prevented. This configuration has the advantage that even relatively large torques can be transmitted without the roller axle also rotating.

It is also preferred if such a bearing element is manufactured from a material which has vibration-damping and/or noise-damping and/or electrically conductive properties, and is preferably composed of polypropylene or polyamide. A polyamide with electrically conductive properties is particularly preferred as material. Such a bearing element allows the transport roller to be insulated from the bearing frame with respect to vibration and enables shocks and vibrations to be damped. Noises are reduced and the drift conveyor can be operated at higher speeds. The electrostatic charging of the transport roller can be derived via the bearing frame by means of the preferred conductive property.

A further aspect of the invention relates to a roller plate for end-side coverage of a transport roller of a drift conveyor, which roller plate has an axle hole for receiving a roller axle, a plate sealing region and a plate rotation locking region which is configured in such a way that rotation of the roller plate with respect to an adjoining component, in particular with respect to a bearing element as described above, can be prevented.

In such a roller plate the plate sealing region and the plate rotation locking region advantageously at least partially coincide, and a plate surface region of the first plate rotation locking region is therefore embodied, to the same degree, as a plate sealing face of the first plate sealing region. The advantages of such a configuration correspond to those which have been described with respect to the bearing element.

Likewise preferred is such a roller plate wherein the plate surface region is configured in such a way that in a developed view of a sectional plane, which corresponds essentially to a cylindrical face about a reference axis of the roller axle which is to be accommodated and which runs through the plate surface region, a curve runs along the plate surface profile, essentially along a zigzag-shaped or corrugated, in particular a sinusoidal curve. The advantages of such a configuration correspond to those which have been described with respect to the bearing element.

Likewise preferred is such a roller plate in which the plate surface region is configured in such a way that the locus curves of at least some points on the zigzag-shaped or corrugated curve run outward in an essentially radial direction along the plate surface profile from the reference axis. The advantages of such a configuration correspond to those which have been described with respect to the bearing element.

It is advantageous in such a roller plate if it has a surface configuration which surrounds the plate sealing region and is embodied as a second part of a labyrinth seal. The advantages of such a configuration correspond to those which have been described with respect to the bearing element.

It is additionally advantageous if, in such a roller plate, the axle hole has at least one roller axle bearing face which is configured in such a way that the roller plate forms, with the external diameter of a corresponding roller axle, a fit which permits it to mount the roller plate on the roller axle in such a way that it can be displaced in the axial direction without significant play. As a result, the roller plate can be pressed onto the bearing element in order to produce the sealing function.

Likewise advantageous is such a roller plate in which the axle hole has at least one force accumulator stop which is configured in such a way that a force accumulator can act on the force accumulator stop in order to displace the roller plate in an axial direction on a roller axle wherein the force accumulator stop is preferably embodied as first or second roller axle bearing face. This ensures that the roller plate is continuously pressed onto the bearing element so that the sealing function is continuously ensured. In addition, axial play between the transport roller and the bearing frame can be compensated and a lack of parallelism between the profiles can be compensated.

In one preferred embodiment, in such a roller plate the axle hole extends through an axle hole continuation of the roller plate, wherein the axle hole continuation has, on the outside, a roller-bearing bearing face which is configured in such a way that the roller plate forms, with the internal diameter of a corresponding roller bearing, a fit which permits it to mount the roller plate in the roller bearing in such a way that it can be displaced in the axial direction without significant play. In this context it is advantageous that the width of the bearing face of the roller bearing prevents the roller plate from tilting, while the displaceability of the roller plate is maintained.

It is also preferred if, in such a roller plate, the axle hole has a fourth positively locking engagement region which corresponds to an axle region of the roller axle and is configured in such a way that rotation between the roller axle and the bearing element is prevented, wherein displacement of the roller axle with respect to the roller plate remains possible in the axial direction.

A further aspect of the invention concerns a transport roller which has at least one roller outer tube, at least one roller plate as described above, at least one roller bearing, which preferably has a rolling bearing, at least one roller axle and at least a first force accumulator which preferably has a first helical spring, wherein the force accumulator is configured and arranged in such a way that it subjects the roller plate to a force which is suitable for displacing the roller plate on the roller axle relative to the roller outer tube.

In such a transport roller, at least one roller axle is preferably arranged so as to be displaceable relative to the roller outer tube, and is subjected, by means of a second force accumulator, which preferably comprises a second helical spring, to a force which is suitable for pressing the roller axle outward relative to the roller outer tube.

It is advantageous if such a transport roller has two roller plates and two roller axles, of which only one of the roller plates and one of the roller axles is respectively displaceable and subjected to force. This embodiment is less expensive to manufacture than if two roller plates and two roller axles were to be spring mounted. Nevertheless a positively locking engagement region and seal are ensured between roller plates and bearing elements on both sides of the transport roller.

A further aspect of the invention concerns a drift conveyor, which has at least one bearing frame, at least one transport roller as described and at least one bearing element, wherein the bearing element is inserted into a corresponding recess in the bearing frame, the roller axle of the transport roller is held in the axle receptacle of the bearing element, and the roller plate is pressed onto the bearing element via the force accumulator in such a way that the first sealing region of the bearing element is in contact with the plate sealing region of the roller plate, the first positively locking engagement region of the bearing element is in contact with the plate rotation locking region of the roller plate, and the second sealing region of the bearing element is in contact with the bearing frame sealing region.

Individual, particularly preferred embodiments of the invention will be described below by way of example. In this context, the individual embodiments which are described have, to a certain extent, features which are not absolutely necessary to implement the present invention but which are generally considered to be preferred. For example, embodiments which do not have all the features of the embodiments described below will be considered as having been disclosed in such a way that they are included within the teaching of the invention. It is also conceivable for features which are described with respect to different embodiments to be combined selectively with one another.

BRIEF DESCRIPTION OF THE DRAWINGS

FIGS. 6a to 6d show a further embodiment of a roller plate in various views and sections, and FIGS. 7a to 7d show the bearing element shown in FIGS. 5a to d and the roller plate shown in FIGS. 6a to 6d, in a seal-forming contact.

DETAILED DESCRIPTION OF THE PREFERRED EMBODIMENTS

Figure 2:
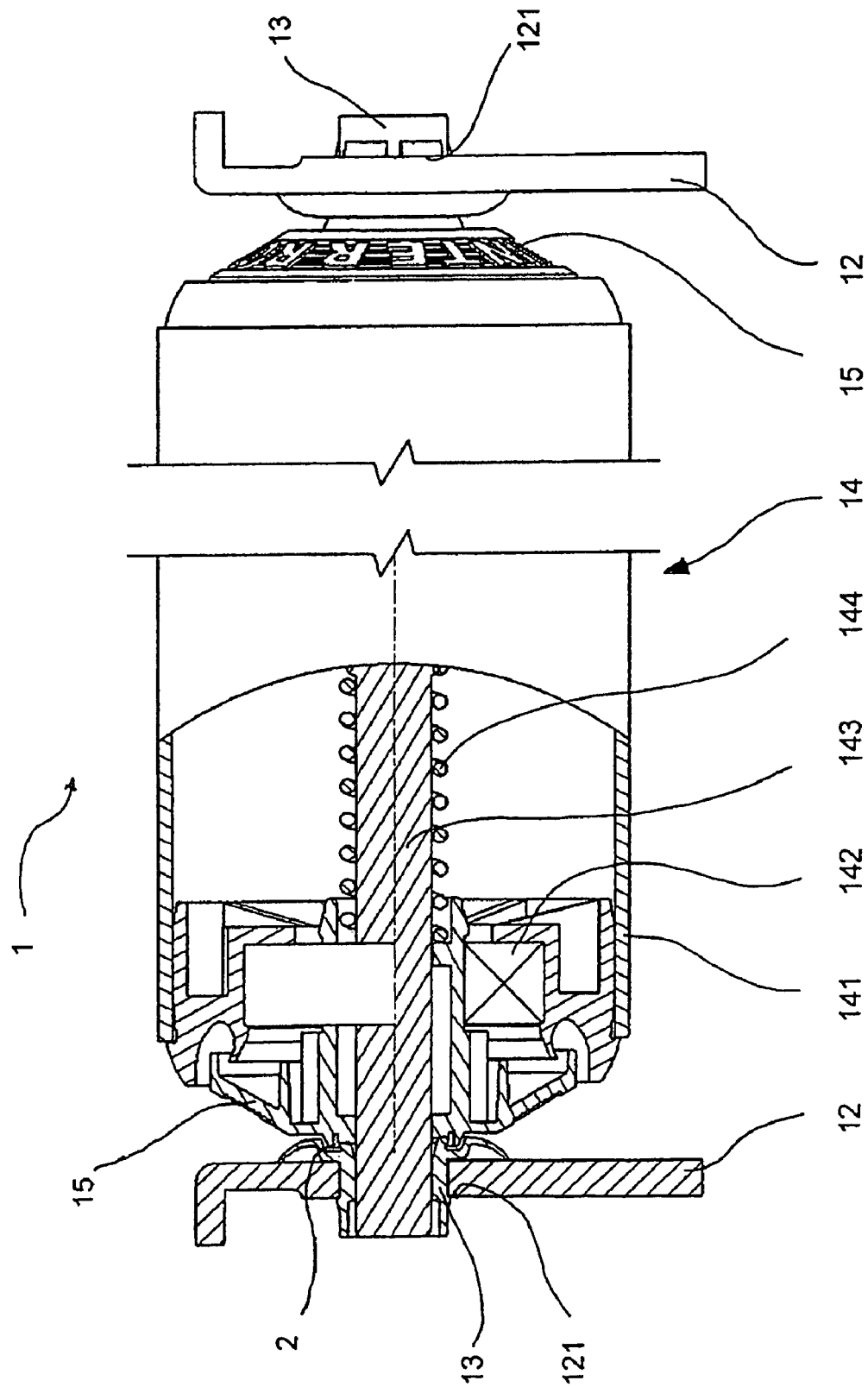
FIG. 2 shows a drift conveyor (illustrated partially in cross section) according to the invention.

FIG. 2 shows a drift conveyor 1 according to the invention which is illustrated partially in cross section. The drift conveyor 1 respectively has a bearing frame 12 on the side illustrated to the left of the figure and a bearing frame 12 to the side illustrated on the right in the figure. The bearing frame 12 is illustrated as an L-shaped profile in the drawing. However, it can also be embodied as a U-shaped profile which has a cover on one side, with the result that the bearing frame has a closed profile. It is also conceivable for other profile cross sections to be used.

Furthermore, the drift conveyor 1 has a transport roller 14 which has a roller outer tube 141, a roller bearing 142, a roller axle 143, a first force accumulator 144 and a second force accumulator (not shown). On the one hand, a plurality of transport rollers 14 which are arranged one next to the other and on which the goods to be transported directly rest can be provided in a drift conveyor 1. It is also conceivable for a belt to be guided over the transport rollers.

Roller bearing 142 is embodied in the illustrated embodiment as a rolling bearing. Other bearings such as, for example, sliding bearings are also conceivable.

The roller axle 143 can be embodied as a single-piece roller axle which extends over the entire width of the transport roller and projects from it on both sides of the transport roller 14. However, it is preferred if two roller axles 143 are provided. In this way, both roller axles but preferably just one roller axle 143 can be displaceably mounted, with the result that the roller axle can be pressed in the direction of the interior of the transport roller, against a second force accumulator which is preferably formed from a helical spring and is not shown in the illustrated drawing. In this design, such a transport roller 14 can easily be inserted into the bearing frame 12 and removed therefrom, since the sprung roller axle 143 only has to be pressed into the interior of the transport roller 14 and can rebound into the axle receptacle 1310 of the bearing element 13 after insertion into the drift conveyor.

As is apparent in FIG. 2, the drift conveyor 1 also has two roller plates 15 which are arranged on the left-hand and right-hand sides of the transport roller 14. The roller plate 15 which is shown on the left-hand side is displaceably mounted on the roller axle 143 and a force is applied to it via a first force accumulator 144 which is formed by a helical spring in the embodiment shown. As a result, the roller plate 15 on the roller axle 143 is forced in the direction of the bearing element 13, which is shown on the left-hand side in FIG. 2. The first force accumulator 144 can also be formed by a leaf spring, a disk spring, rubber buffer and/or any desired other force accumulator, instead of a helical spring.

The force which is transmitted to the roller plate 15 by the first force accumulator 144, and by means of which the roller plate 15 is pressed to the left onto the bearing element 13 which is also illustrated in FIG. 2 causes corresponding regions of the bearing element 13 and of the roller plate 15 to come into contact. In addition, the bearing element 13 is pressed onto the bearing frame 12.

The same also applies with respect to the right-hand roller plate 15 which is illustrated in FIG. 2. However, it will generally be sufficient if in the case of a transport roller 14 a force is applied to just one of the two roller plates because this force acts in both directions and as a result the right-hand roller plate 15 is also in contact with the right-hand bearing element 13, and the right-hand bearing element 13 is also forced onto the right-hand bearing frame 12 by means of the right-hand roller plate 15.

The type of contact between the bearing element 13 and the roller plate 15 as well as between the bearing element 13 and bearing frame 12 produces a seal between the elements. The seal comes about by virtue of the fact that, on the one hand, sealing faces which are provided are in engagement with one another, and on the other hand a relative rotation between the parts is prevented, with the result that moisture or dust cannot penetrate along the sealing faces as a result of a relative rotation.

The corresponding sealing regions and positively locking engagement regions of the bearing element 13 of the bearing frame 12 and of the roller plate 15 are described in more detail below.

Figure 1:
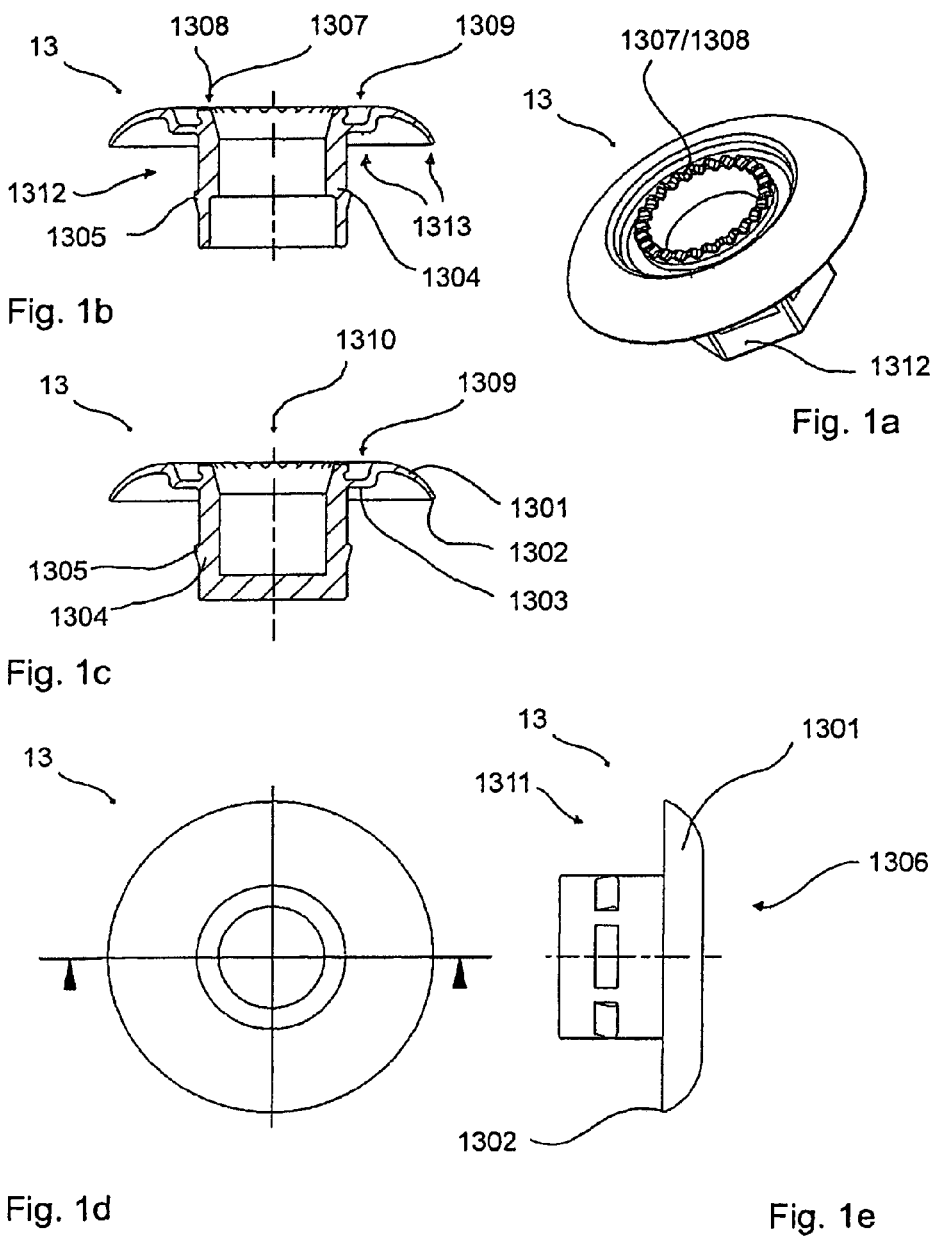
FIGS. 1b and 1c show two cross sections through two preferred embodiments of a bearing element according to the invention—one with a continuous axle receptacle and one with a blind-hole-like axle receptacle.
FIGS. 1a, 1d and 1e show the embodiments of the bearing element illustrated in FIGS. 1b and 1c as a plan view, side view and as an isometric view.

The bearing element 13 is illustrated in detail in FIGS. 1a to 1e. FIG. 1a shows the bearing element 13 in an isometric view. As is apparent in this figure, the bearing element 13 is preferably in the form of a mushroom with a cap element 1301 and a stem element 1304. As is clearly apparent in FIG. 1a, this preferred embodiment of the bearing element 13 has a hexagonal stem element 1304. In this preferred embodiment, the stem element 1304 therefore has a second positively locking engagement region 1312 which is formed by this hexagonal configuration of the stem element. The stem element can be inserted into a corresponding hexagonal recess in the bearing element 12, and the bearing element 13 therefore cannot rotate in the bearing frame 12.

In addition, the bearing element 13 has, on the stem element 1304, holding elements 1305 which, when the bearing element 13 is inserted into the bearing frame 12, can engage behind corresponding holding regions 121 of the bearing frame, with the result that the bearing element 13 is secured against dropping or slipping out of the bearing frame 12. The holding elements 1305 also ensure that the second sealing region 1313 is also held in a seal-forming engagement with the bearing frame 12, as is described in more detail below.

Figure 3B:
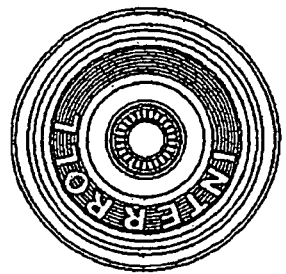
FIGS. 3a to 3c show a transport roller according to the invention in various views.
Figure 3D:
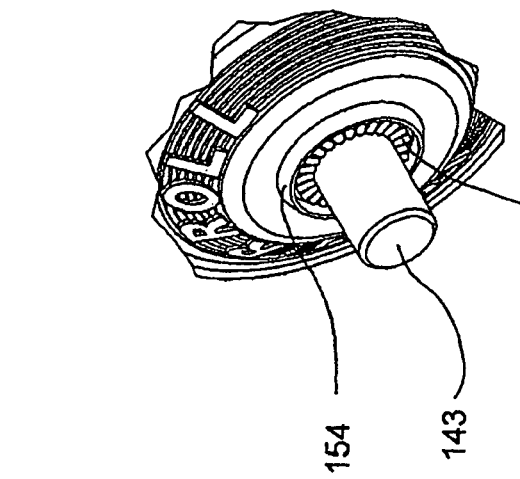
FIG. 3d shows an enlarged detail of the roller plate which is marked with a circle in FIG. 3c.
Figure 3A:
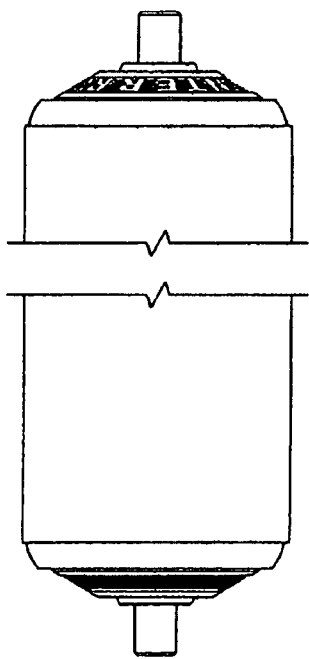
Figure 3C:
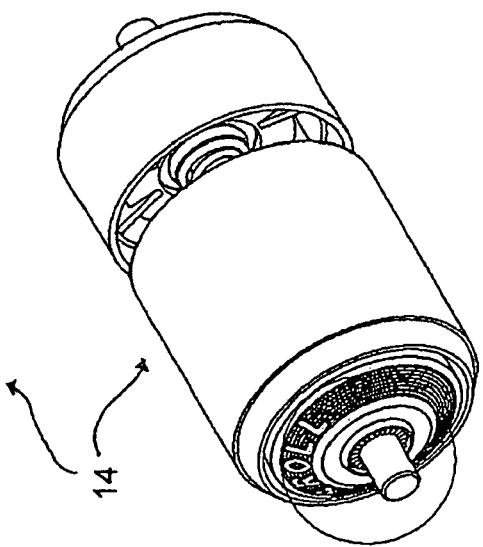
Figure 4:
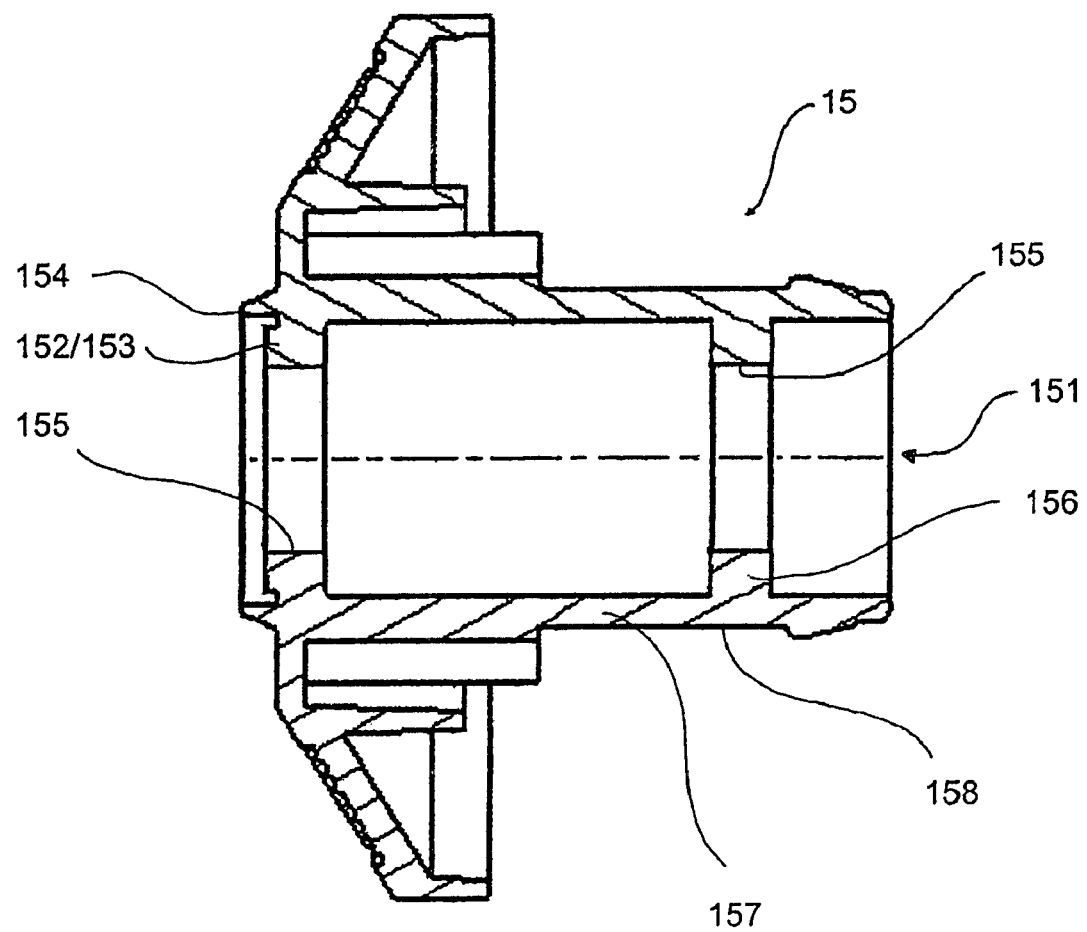
FIG. 4 shows an embodiment of a roller plate according to the invention.
Figure 5A:
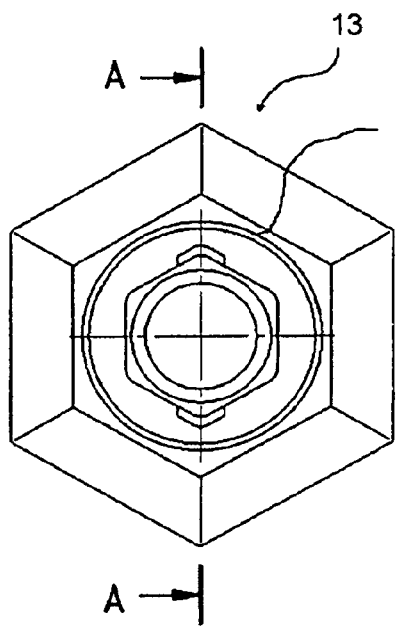
FIGS. 5a to 5d show a further embodiment of a bearing element in various views and sections.
Figure 5B:
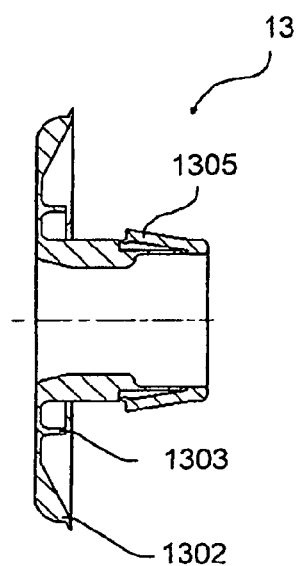
Figure 5C:
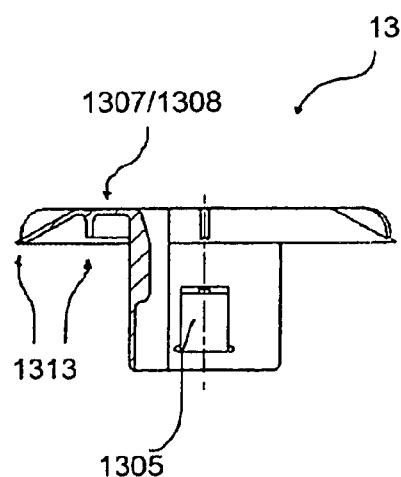
Figure 5D:
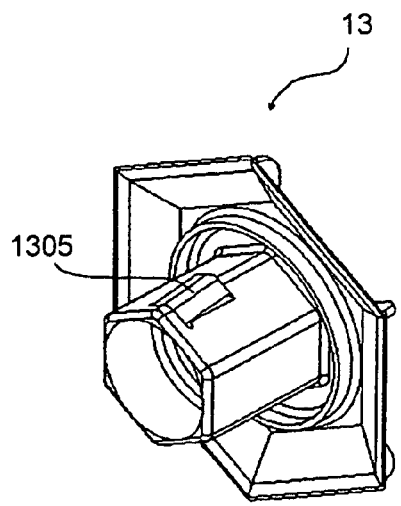

On the side of the cap element 1301 facing away from the stem element, a sealing region 1307a and a positively locking engagement region 1308 which extend in a corrugated shape are provided. In the illustrated embodiment, the first sealing region 1308 therefore advantageously coincides with the first positively locking engagement region 1307a. The surface regions which are formed in this way correspond to a matching plate sealing region 152 and a matching plate positively locking engagement region 153a of the roller plate 15, which are illustrated in FIGS. 3d and 4.

The corresponding regions are configured in such a way that the regions bear against one another in a planar fashion if contact comes about between the parts. By means of a corresponding contact pressure force, which is made available via the first force accumulator 144, minimal unevenness of the surfaces which may be present are pressed smooth with the result that fluids cannot pass through the sealing faces.

Sealing regions and positively locking engagement regions do not need to coincide but rather cannot be of separate design. This would have the advantage that fewer precise tolerances would have to be maintained during manufacture. A sealing face could be provided in one plane, as a result of which it would be easier to manufacture than a surface with curvatures, as in the illustrated embodiment. However, the illustrated embodiment can be embodied in a space-saving fashion and does not require double fitting, as would possibly be the case with separate sealing regions and positively locking engagement regions.

As is illustrated in FIG. 2, the sealing region and positively locking engagement region are surrounded by a labyrinth seal 2. This labyrinth seal 2 is formed from two corresponding parts of the bearing element 13 on one side and of the roller plate 15 on the other side. These two parts of the labyrinth seal 2 are denoted by the reference symbol 1309 in FIGS. 1b and 1c, and by the reference symbol 154 in FIGS. 3d and 4. This labyrinth seal prevents moisture and dust from penetrating into the sealing regions and positively locking engagement regions.

On the second side 1311 of the bearing element 13, a second sealing region 1313 is provided, which is formed by a sealing lip 1302 and by a central sealing region 1303 in the illustrated embodiment. The sealing lip 1302 is preferably of more resilient design than the central sealing region 1303, with the result that the sealing lip 1303 fits snugly against corresponding sealing regions of the bearing frame 12 when the bearing element 13 is inserted into a matching recess of the bearing frame 12 and is pressed against the bearing frame 12 by means of the roller plate 15 via the force accumulator 144. In contrast, the central sealing region can withstand a contact pressure force which results from the applied force of the force accumulator 144, and can contribute to improved tightness by virtue of the contact pressure force.

By virtue of the holding elements 1305, a corresponding sealing effect can already come about without a force being transferred to the sealing element 13 via the force accumulator 144. It is preferred here if the stem element 1304 of the bearing element 13 has a certain degree of intrinsic elasticity, with the result that a tension is generated in the bearing element 13 by means of correspondingly selected dimensions between the holding element 1305 and the central sealing region 1303, on the one hand, and the corresponding material thickness of the bearing frame 12. By virtue of this tension, the sealing lip 1302 and/or the central sealing region 1303 fits snugly against the bearing frame 12, even if the transport roller 14 is not yet inserted into the bearing frame 12.

In this case, it is particularly preferred if the bearing element 13 has a blind-hole-like axle receptacle 1310 since in this case the profile, which is formed by the bearing frame 12, is sealed even without the roller axle or transport roller 14 being inserted.

On the other hand, a bearing element 13 which has a continuous axle receptacle 1310 has the advantage that, when the transport roller 14 is disinstalled, for example a sprung roller axle 143 can be pressed through the bearing element 13 from behind, and can therefore be easily disinstalled.

A further preferred aspect of the bearing element 13 concerns a vibration-damping property of the bearing element 13. The bearing element is preferably manufactured from polypropylene and even more preferably from polyamide. By virtue of the material properties it is possible to avoid steel-to-steel contact between the roller axle 143 and the bearing frame 12. This configuration of the bearing element 13 allows vibrations to be damped and therefore reduces loading on the components. This leads to a longer service life of the parts. Furthermore, noise is avoided. Sensitive goods which are to be conveyed on the drift conveyor 1 can also be conveyed at higher speeds than would be the case with drift conveyors without corresponding bearing elements.

FIG. 4 shows a roller plate 15 in cross section. Roller axle bearing faces of the roller plate in the axle hole 151 are denoted by the reference symbol 155. The roller plate 15 is mounted on the roller axle 143 by means of these roller axle bearing faces 155. In this context, a corresponding fit between the roller plate 15 and the roller axle 143 preferably ensures that the roller outer tube 141 of the transport roller 14 is preferably mounted without play on the axle by means of the roller bearing 142, and a corresponding intermediately connected component by means of the roller plate 15.

The fit between the roller plate 15 and roller axle 143 is therefore preferably dimensioned in such a way that, on the one hand, play-free bearing of the transport roller 14 is ensured and, on the other hand, the roller plate 15 is displaceable on the roller axle 143 and can be displaced from the force accumulator 144 to the bearing element 13 and the bearing frame 12.

The same applies to a fit between the bearing face 158 of the roller bearing and the roller bearing 142. Play-free bearing is also preferably ensured between these two components, and displaceability between the roller bearing 142 and the roller plate 12 is also advantageous here.

The roller plate 15 is illustrated in FIG. 4 by an additional force accumulator stop 156. The force accumulator stop 156 provides, on the one hand, an engagement face for the first force accumulator 144, by means of which engagement face the roller plate 15 can be pressed onto the bearing element 13. On the other hand, in the illustrated embodiment the force accumulator stop 156 has a further roller axle bearing face 155. The second roller axle bearing face 155 prevents the roller plate 15 from tilting on the roller axle 143. Since the roller plate 15 in the illustrated embodiment has an undercut between the two roller axle bearing faces 155 on the left-hand side and on the right-hand side in the figure, such a roller plate 15 can only be manufactured with difficulty using an injection molding method. It is therefore likewise conceivable to embody such a roller plate 15 with a continuous roller axle bearing face 155. However, it is preferred to provide just one roller axle bearing face 155 on the left-hand side. In this case, the force accumulator 144 could act on the stop face which is illustrated on the left in the figure. Tilting of the roller plate 15 on the roller axle 143 is prevented in this case by means of the fit between the roller plate 15 and the roller bearing 142.

A further embodiment of the invention is illustrated in FIGS. 5 to 7 and described in the text which follows.

The embodiment is very similar to what is described above. In order to avoid unnecessary repetitions, reference is therefore made just to the features which provide new aspects compared to the embodiment already described. The reference symbols which have essentially denoted identical features are retained.

In this embodiment, the rotation locking region of the bearing element 13 is embodied as a friction locking region 1307*b*. In this embodiment, no positive locking engagement is provided on the first side 136 of the bearing element 13. Rotation of the bearing element with respect to the adjoining roller plate 15 is prevented by means of the contact pressure between the respective components and, if appropriate, additionally by means of an O ring 3 located between them, as is clearly apparent in FIGS. 7*a* and 7*c*. The O ring is arranged in a groove in the roller plate 15. The rotation locking region is provided as a friction locking region 1307*b* in a preferably concave base of the groove, as can be seen.

The groove has, as illustrated, a cross-sectional shape which preferably corresponds essentially to a partial circle and which is somewhat larger than the cross-sectional diameter of the O ring 3. On the side of the groove facing the roller axle, the edge of the groove projects somewhat in the direction of the O ring, and a slight undercut is therefore formed, preventing the O ring 3 from being able to slip out of the groove in the unassembled state and causing it to therefore be securely held in said groove. Alternatively, the groove can also be provided on the bearing element 13.

Dependent on the torque which is to be transmitted, the contact pressure force which is transmitted via the first force accumulator 144 to the roller plate 15 is dimensioned in such a way that, with consideration of the coefficient of friction between the materials of the roller plate 15 and of the bearing element 13, a corresponding frictional force is produced in the circumferential direction.

As is apparent in particular in FIGS. 7b and 7c, in this embodiment the roller plate 15 and the bearing element 13 are not in direct contact. The contact pressure force is therefore not large enough to compress the O ring, which is more elastic than the roller plate 15 and the bearing element 13 to such an extent that the roller plate 15 and the bearing element 13 come into direct contact.

However, it is conceivable for the dimensions of the components and the contact pressure force to be selected such that the O ring is compressed to such an extent that the roller plate and the bearing element come into contact. Such a contact face can serve as a further sealing face between the roller plate 15 and bearing element 13. In addition, it is also conceivable for the O ring to be entirely omitted and for the friction locking region 1307b and plate friction locking region 153b to be in direct contact with one another. In addition it is conceivable for the described O ring 3 to be provided, in the embodiment first described, with a corresponding groove on one of the components in addition to the positively locking engagement region 1307a or the plate positively locking engagement region 153a described there.

As is shown in FIGS. 5a to 5d, the holding element 1305 is embodied in the shown embodiment in the form of an elastic clip which, when the bearing element 13 is inserted into the bearing frame 12, can initially yield in the outward direction and subsequently spring back elastically in order to engage behind the holding region 121 of the bearing frame. Such an embodiment of the holding element 1305 can also be provided in the embodiment described first.

As is apparent in FIG. 7b, in the assembled state of the components the contact pressure force is transmitted from the roller plate 15 to the bearing element 13 via the O ring 3. In the illustrated preferred embodiment, the O ring 3 presses onto a frictional locking region 1307b of the bearing element 13, on the rear of which, directly behind this region, an annular central sealing region 1303 is formed, which annular central sealing region 1303 is spaced apart somewhat from the stem element 1305. For this reason, the contact pressure force is satisfactorily transmitted to this central sealing region 1303, which produces a good sealing effect.

The invention claimed is:

1. A bearing element (13) having a sealing function, for holding a roller axle (143) of a transport roller (14) that is to be supported, the bearing element (13) being configured to be inserted into a bearing frame (12), the bearing element (13) having an axle receptacle (1310), a first sealing region (1308) configured for liquid impermeable sealing contact with a plate sealing region (152) of an adjacent roller plate (15) of the transport roller (14) and a rotation locking region (1307a; 1307b) on a first side (1306), wherein the rotation locking region (1307a; 1307b) is configured to contact a plate rotation locking region (153a; 153b) of the adjacent roller plate (15) so that rotation of the bearing element (13) with respect to the roller plate (15) can be prevented, wherein the bearing element (13) has, on a second side (1311), lying essentially opposite the first side (1306) of the bearing element (13), a second sealing region (1313) for providing a liquid impermeable seal between the bearing element (13) and the bearing frame (12).

2. The bearing element (13) as claimed in claim 1, wherein the first sealing region (1308) and the rotation locking region (1307a; 1307b) at least partially coincide, and a first surface region of the rotation locking region (1307a; 1307b) is therefore likewise configured as a first sealing face of the first sealing region (1308).

3. The bearing element (13) as claimed in claim 2, wherein the first surface region is configured in such a way that in a developed view of a sectional plane, which coincides essentially with a concentric cylinder face about the roller axle (143) to be held and which runs through the first surface region, a zigzag-shaped, corrugated or sinusoidal curve runs along the surface profile so that the rotation locking region (1307a; 1307b) defines a first positively locking engagement region (1307a).

4. The bearing element (13) as claimed in claim 3, wherein the first surface region is configured in such a way that at least some of the points on the zigzag-shaped or corrugated curve are located on locus curves, wherein the locus curves run outward in an essentially radial direction along the surface profile from a reference axis corresponding to an axis of the roller axle.

5. The bearing element (13) as claimed in claim 1, which has a surface configuration which surrounds the first sealing region (1308) and which is embodied as a first part (1309) of a labyrinth seal.

6. The bearing element (13) as claimed in claim 1, which has a mushroom-like shape with a cap element (1301) and a stem element (1304), wherein the first sealing region (1308) is arranged on the side of the cap element (1301) facing away from the stem element (1304).

7. The bearing element (13) as claimed in claim 1, which has a mushroom-like shape with a cap element (1301) and a stem element (1304), wherein the second sealing region (1313) is arranged on the side of the cap element (1301) facing the stem element (1304).

8. The bearing element (13) as claimed in claim 7, wherein the second sealing region (1313) is formed from a sealing lip (1302) at an edge region of the cap element (1301) and a central sealing region (1303) of the cap element (1301) which is arranged essentially adjacent to the stem element (1304), wherein, in the state in which the stem element (1304) is not inserted into the bearing frame, the sealing lip (1302) protrudes beyond the central sealing region (1303) in a direction of the bearing frame (12).

9. The bearing element (13) as claimed in claim 1, which has a second positively locking engagement region (1312) on the second side in the region of a stem element (1304), wherein the second positively locking engagement region (1312) is configured in such a way that rotation of the bearing element (13) with respect to a second component which adjoins on the second side is prevented.

10. The bearing element (13) as claimed in claim 9, wherein the second positively locking engagement region (1312) is formed at least partially from a polygonal cross-sectional region, preferably from a hexagonal cross-sectional region, of the stem element (1304).

11. The bearing element (13) as claimed in claim 1, in which at least one holding element (1305) is provided which is configured in such a way that, in the state in which the bearing element (13) is inserted into the bearing frame (12), the holding element (1305) engages behind a corresponding holding region (121) of the bearing frame (12) in such a way that the bearing element (13) is secured against dropping or sliding out of the bearing frame (12), wherein the distance between a central sealing region (1303) of the bearing element (13) and the holding element (1305) of the bearing element (13) is essentially equal to or somewhat smaller than the distance between the holding region (121) of the bearing element (13) and a bearing frame sealing region which coincides with the central sealing region (1303).

12. The bearing element (13) as claimed in claim 1, in which the axle receptacle (1310) is embodied as a blind hole.

13. The bearing element (13) as claimed in claim 1, in which the axle receptacle (1310) is embodied as a through hole.

14. The bearing element (13) as claimed in claim 1, in which the axle receptacle (1310) is dimensioned, with respect to a roller axle (143) which is to be accommodated, in such a way that a fit is provided between the roller axle (143) and the axle receptacle (1310), where the fit impedes or prevents rotation between the roller axle (143) and the bearing element (13).

15. The bearing element (13) as claimed in claim 1, in which the axle receptacle (1310) has a bearing element positively locking engagement region which coincides with an axle region of the roller axle (143) and is configured in such a way that rotation between the roller axle (143) and the bearing element (13) is impeded or prevented.

16. The bearing element (13) as claimed in claim 1, which is manufactured from a material which has vibration-damping and/or noise-damping and/or electrically conductive properties, and is comprised of polypropylene or polyamide.

17. A roller plate (15) for end-side coverage of a transport roller (14) of a drift conveyor (1), which roller plate (15) has an axle hole (151) for receiving a roller axle (143), a plate sealing region (152) configured for liquid impermeable sealing contact with a sealing region (1308) of an adjoining component and a plate rotation locking region (153a; 153b) which is configured to contact a rotation locking region (1307a; 1307b) of the adjoining component in such a way that rotation of the roller plate (15) with respect to the adjoining component is prevented.

18. The roller plate (15) as claimed in claim 17, wherein the plate sealing region (152) and the plate rotation locking region (153a; 153b) at least partially coincide, and a plate surface region of the first plate rotation locking region (153a; 153b) is therefore embodied, to the same degree, as a plate sealing face of the first plate sealing region.

19. The roller plate (15) as claimed in claim 18, wherein the plate surface region is configured in such a way that in a developed view of a sectional plane, which corresponds essentially to a concentric cylindrical face about the roller axle (143) which is to be accommodated and which runs through the plate surface region, a curve runs along the plate surface profile, essentially along a zigzag-shaped, corrugated or sinusoidal curve runs along the plate surface profile, so that the plate rotation locking region (153a; 153b) defines a first plate positively locking engagement region (153a).

20. The roller plate (15) as claimed in claim 19, wherein the plate surface region is configured in such a way that at least some points on the zigzag-shaped or corrugated curve are located on locus curves, wherein the locus curves run outward in an essentially radial direction along the plate surface profile from the reference axis.

21. The roller plate (15) as claimed in claim 17, which has a surface configuration which surrounds the plate sealing region (152) and is embodied as a second part (154) of a labyrinth seal (2).

22. The roller plate (15) as claimed in claim 17, wherein the axle hole (151) has at least one roller axle bearing face (155) which is configured in such a way that the roller plate (15) forms, with the external diameter of a corresponding roller axle (143), a fit which permits it to mount the plate on the roller axle (143) in such a way that it can be displaced in the axial direction without significant play.

23. The roller plate (15) as claimed in claim 17, wherein the axle hole (151) has at least one force accumulator stop (156) which is configured in such a way that a first force accumulator can act on the force accumulator stop (156) in order to displace the roller plate (15) in an axial direction on a roller axle (143) wherein the force accumulator stop (156) preferably has a roller axle stop face (155).

24. The roller plate (15) as claimed in claim 17, wherein the axle hole (151) extends through an axle hole continuation (157) of the roller plate (15), wherein the axle hole continuation (157) has, on the outside, a roller-bearing bearing face (158) which is configured in such a way that the roller plate (15) forms, with the internal diameter of a corresponding roller bearing, a fit which permits it to mount the roller plate (15) in the roller bearing (142) in such a way that it can be displaced in the axial direction without significant play.

25. The roller plate (15) as claimed in claim 17, wherein the axle hole (151) has a roller plate positively locking engagement region which corresponds to an axle region of the roller axle (143) and is configured in such a way that rotation between the roller axle (143) and the bearing element (13) is prevented, wherein displacement of the roller axle (143) with respect to the roller plate (15) remains possible in the axial direction.

26. The roller plate (15) as claimed in claim 17, which also has an annular groove and an O ring (3) which is arranged in the groove, wherein the plate sealing region (152) and/or the plate rotation locking region (153a; 153b) are made available by the O ring.

27. The roller plate (15) as claimed in claim 26, wherein the groove is provided on the end side on the side of the roller plate facing the bearing element.

28. The roller plate (15) as claimed in claim 26, wherein the groove has a cross-sectional shape which corresponds essentially to a partial circle and which is somewhat larger than the cross-sectional diameter of the O ring (3), wherein the edge of the groove projects somewhat in the direction of the O ring (3) on the side of the groove facing the roller axle, and an undercut is therefore formed which prevents the O ring (3) from being able to slip out of the groove in the non-assembled state, and said O ring (3) is therefore securely held in said groove.

29. A transport roller (14) which has at least one roller outer tube (141), at least one roller plate (15) as claimed in claim 17, at least one roller bearing (142), at least one roller axle (143) and at least a first force accumulator (144), wherein the first force accumulator (144) is configured and arranged in such a way that it subjects the roller plate (15) to a force which is suitable for displacing the roller plate (15) with respect to the roller axle (143) in the axial direction and relative to the roller outer tube (141).

30. The transport roller (14) as claimed in claim 29, in which at least one roller axle (143) is arranged so as to be displaceable relative to the roller outer tube (141), and is subjected, by means of a second force accumulator, to a force which is suitable for pressing the roller axle (143) outward relative to the roller outer tube (141).

31. The transport roller (14) as claimed in claim 29, which has two roller plates (15) and two roller axles, of which only one of the roller plates (15) and one of the roller axles is respectively displaceable and subjected to force.

32. A drift conveyor (1), which has at least one bearing frame (12), at least one transport roller (14) that has at least one outer tube (141), at least one roller plate (15) as claimed in claim 17, at least one roller bearing (142), at least one roller axle (143) and at least a first force accumulator (144), wherein the first force accumulator (144) is configured and arranged to subject the roller plate (15) to a force suitable for displacing the roller plate (15) on the roller axle (143) relative to the roller outer tube (141), and wherein the drift conveyor (1) has at least one bearing element (13), wherein the bearing element (13) is inserted into a corresponding recess in the bearing frame (12), the roller axle (143) of the transport roller (14) is held in the axle receptacle (1310) of the bearing element (13), and the roller plate (15) is pressed onto the bearing element (13) via the first force accumulator (144) in such a way that the first sealing region (1308) of the bearing element (13) is in contact with the plate sealing region (152) of the roller plate (15), the rotation locking region (1307a; 1307b) of the bearing element (13) is in contact with the plate rotation locking region (153a; 153b) of the roller plate (15), and the second sealing region (1313) of the bearing element (13) is in contact with the bearing frame sealing region.

33. The drift conveyor (1) as claimed in claim 32, in which the rotation locking region is embodied as a friction locking region (1307b), wherein an O ring (3) is provided between the bearing element (13) and the roller plate (15).

* * * * *